US 11,410,562 B1

(12) United States Patent
Mishra

(10) Patent No.: US 11,410,562 B1
(45) Date of Patent: Aug. 9, 2022

(54) AERIAL VEHICLE TRAVEL RELATED DATA COLLECTION AND ROUTE OPTIMIZATION

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 16/540,784

(22) Filed: Aug. 14, 2019

(51) Int. Cl.
*G08G 5/00* (2006.01)
*B64C 39/02* (2006.01)

(52) U.S. Cl.
CPC ......... *G08G 5/0069* (2013.01); *B64C 39/024* (2013.01); *G08G 5/0008* (2013.01); *G08G 5/0091* (2013.01); *B64C 2201/027* (2013.01); *B64C 2201/143* (2013.01)

(58) Field of Classification Search
CPC .. G08G 5/0069; G08G 5/0091; G08G 5/0008; G08G 5/0039; G08G 5/0034; G08G 5/003; G08G 5/025; G08G 5/0047; B64C 2201/143; B64C 2201/027; B64C 39/024
See application file for complete search history.

(56) References Cited

U.S. PATENT DOCUMENTS

| | | | | |
|---|---|---|---|---|
| 9,959,771 | B1* | 5/2018 | Carlson | G08G 5/0039 |
| 10,410,291 | B1* | 9/2019 | Binion | G01C 23/00 |
| 10,586,462 | B1* | 3/2020 | Stein | G05D 1/0055 |
| 2018/0017976 | A1* | 1/2018 | Bash | G08G 5/0052 |
| 2018/0090016 | A1* | 3/2018 | Nishi | G05D 1/102 |
| 2019/0051195 | A1* | 2/2019 | De La Guardia Gonzalez | G08G 5/0039 |
| 2019/0114564 | A1* | 4/2019 | Ferguson | G06Q 10/06312 |
| 2019/0265705 | A1* | 8/2019 | Zhang | B64C 39/024 |
| 2019/0271563 | A1* | 9/2019 | Pandit | G01C 21/20 |
| 2020/0234601 | A1* | 7/2020 | Ivanov | G08G 5/0069 |

FOREIGN PATENT DOCUMENTS

CN 108871371 A * 11/2018

* cited by examiner

*Primary Examiner* — Anne Marie Antonucci
*Assistant Examiner* — Connor L Knight
(74) *Attorney, Agent, or Firm* — Athorus, PLLC

(57) ABSTRACT

Disclosed are systems and methods that collect travel related data, which includes, but is not limited to, characteristics of obstacles, environmental conditions (e.g., wind speed, rain, barometric pressure, humidity), crowds of people, magnetic interference, etc., and operational characteristics of the aerial vehicle that result from the environmental conditions. The travel related data is then used to determine and/or optimize flight plans for aerial vehicles between a source location and a destination location.

19 Claims, 10 Drawing Sheets

AERIAL VEHICLE TRAVEL RELATED DATA COLLECTION AND ROUTE OPTIMIZATION

BACKGROUND

Unmanned vehicles are continuing to increase in use. For example, unmanned aerial vehicles are often used for surveillance. There is also discussion of electronic-commerce retailers, and other entities, delivering items directly to a user's home using unmanned aerial vehicles. Unmanned aerial vehicles used by hobbyists often rely completely on receipt of control signals from a user-operated remote control device. Thus, these unmanned aerial vehicles rely on a user to provide most or all navigational instructions. More advanced unmanned aerial vehicles may determine some navigational instructions without direct user input.

BRIEF DESCRIPTION OF THE DRAWINGS

The detailed description is described with reference to the accompanying figures. In the figures, the left-most digit(s) of a reference number identifies the figure in which the reference number appears.

DETAILED DESCRIPTION

Figure 1:
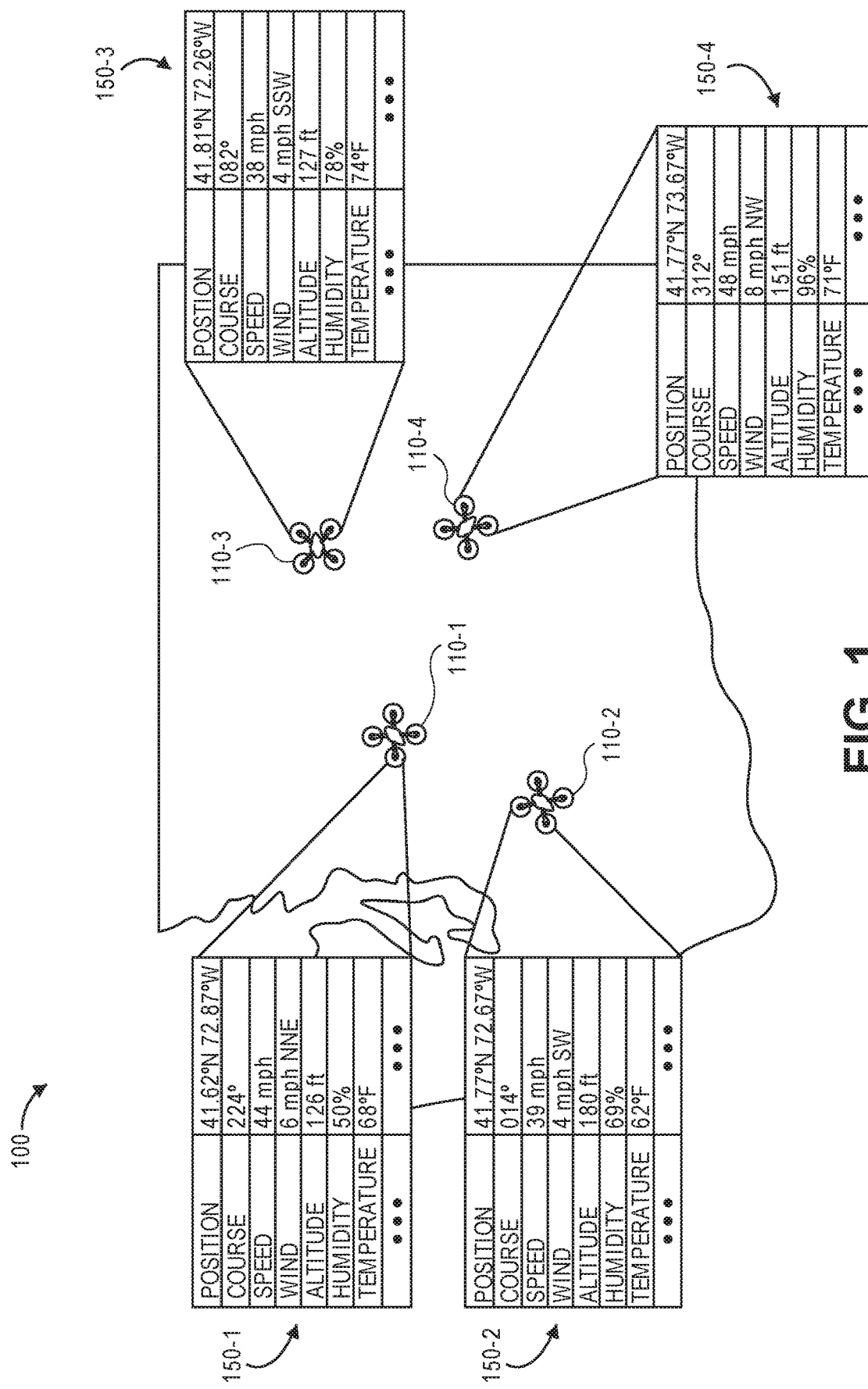
FIG. 1 illustrates an example of travel related data collection by aerial vehicles, according to some implementations.

This disclosure describes an automated system that collects travel related data ("TRD"), which may include, but is not limited to, characteristics of obstacles, environmental conditions (e.g., wind speed, wind direction, altitude, illuminance level, direction of a light source, temperature, radiation, rain, barometric pressure, humidity, illumination level, obstacles, magnetic interference, etc.), and operational characteristics of the aerial vehicle that result from the environmental conditions. This disclosure further describes the use of collected travel related data for route planning and optimization for aerial vehicles. Travel related data may be collected by sensors of aerial vehicles and/or from other sources such as data aggregators, other vehicles, etc., and may be stored (e.g., at a central management system, in UAVs, etc.) for further analysis and use.

In various implementations, different aspects of travel related data may be sensed and collected by different sensors of an aerial vehicle. For example, weather sensors (e.g., wind speed sensors, precipitation sensors, light sensors, etc.) may sense and provide environmental conditions regarding wind speed, direction, amount of precipitation, barometric pressure, temperature, etc., and other sensors (e.g., accelerometers, gyroscopes, pitot tubes, compass) may sense and provide operational characteristics (e.g., pitch, yaw, roll, surge, heave, sway, pose, control surface positions, etc.) of the aerial vehicle that resulted from the experienced weather condition. In still other examples, other sensors (e.g., cameras, distance ranging elements, radar) may sense information indicative of physical objects within the environment.

The travel related data that is sensed and collected by an aerial vehicle may be shared with a central management system, other aerial vehicles, other vehicles, and/or other entities. The aerial vehicle may also use this information locally, in combination with other received travel related data (e.g., for navigating a route, landing, etc.).

In some implementations, during route navigation, when particular environmental conditions are detected, the aerial vehicle may be positioned in those environmental conditions to determine the operational characteristics of the aerial vehicle that result from exposure to the environmental condition. The resulting information, which together is travel related data, may be used during future navigations at the same or different locations to anticipate how aerial vehicles of the same or similar aerial vehicle types will behave when those environmental conditions are again encountered.

When a user places an order for one or more items to be delivered, a central management system may leverage travel related data to determine an anticipated flight plan. The flight plan may be determined for one or more optimization parameters based on stored travel related data between a source location and a destination location. For example, a route between a source location and a destination location may be optimized for safety of humans present between the source location and the destination location, safety of the aerial vehicle, and total navigation time. In other examples, the route may be optimized for safety of humans between the source location and the destination location, safety of the aerial vehicle, and energy usage by the aerial vehicle. As will be appreciated, any of a variety of optimization parameters may be selected. Likewise, the central management system may utilize some or all of the stored travel related data to determine a navigation route, also referred to herein as a flight plan.

Just prior to flight by the aerial vehicle, the aerial vehicle may receive the flight plan and/or other data to assist the aerial vehicle in navigating a planned route. The flight plan may avoid certain areas for which the travel related data indicates there are issues occurring (e.g., areas with recently discovered obstacles, areas with high magnetic interference, areas with low GPS signal strength, areas with large crowds of people, areas with inclement weather, such as high winds, rain, etc.) and/or direct the aerial vehicle into other areas that have preferable conditions (e.g., tail wind).

During flight, the aerial vehicle and/or a central management system may update a flight plan and/or create a new flight plan based on current travel related data. In some implementations, the flight controller of the aerial vehicle may readily make control decisions based on the travel related data. In other examples, the aerial vehicle may be instructed and/or determine to deviate from an existing flight plan or navigation route to explore and collect travel related data for other positions (e.g., different altitudes, different environmental conditions, etc.) As discussed herein, the update of a flight plan includes changes by the flight controller of the control decisions without necessarily establishing new waypoints, for example. Thus, the flight controller may make minor changes in heading based on the travel related data while continuing to navigate toward a predetermined waypoint, such as a destination location, or continuing to achieve other objectives in a flight plan.

FIG. 1 illustrates an example of travel related data collection by aerial vehicles, according to some implementations.

As illustrated in FIG. 1, a plurality of aerial vehicles 110-1, 110-2, 110-3, 110-4 are engaged in flight along various routes within an environment 100. The aerial vehicles 110-1, 110-2, 110-3, 110-4 are configured to capture data 150-1, 150-2, 150-3, 150-4 regarding the aerial vehicles 110-1, 110-2, 110-3, and 110-4, including but not limited to information or data regarding positions, altitudes, courses, speeds, climb or descent rates, turn rates, accelerations, wind velocities, humidity levels and temperatures, pressures, ground speed, etc., using one or more sensors. The aerial vehicles are also configured to periodically broadcast at least some of the information, such as the information included in ADS-B broadcasts (e.g., GNSS position, pressure, altitude, call sign or identifier, track speed, ground speed, humidity, wind speed, etc.).

For example, as is shown in the information or data 150-1 of FIG. 1, the aerial vehicle 110-1 has a current position of 41.62° N 72.87° W, is traveling on a course of 224° and at a speed of 44 miles per hour (mph), in winds of 6 mph out of the northeast, at an altitude of 126 feet, and in air having 50 percent humidity and a temperature of 68 degrees Fahrenheit (° F.). The information or data 150-2 of FIG. 1 indicates that the aerial vehicle 110-2 has a current position of 41.77° N 72.67° W, is traveling on a course of 014° and at a speed of 39 mph, in winds of 4 mph out of the southwest, at an altitude of 180 feet, and in air having 69 percent humidity and a temperature of 62° F. The information or data 150-3 of FIG. 1 indicates that the aerial vehicle 110-3 has a current position of 41.81° N 72.26° W, is traveling on a course of 082° and at a speed of 38 mph, in winds of 4 mph out of the south southwest, at an altitude of 127 feet and in air having 78% humidity and a temperature of 74° F. Finally, the information or data 150-4 of FIG. 1 indicates that the aerial vehicle 110-4 has a current position of 41.77° N 73.67° W, is traveling on a course of 312° and at a speed of 48 mph, in winds of 8 mph out of the northwest, at an altitude of 151 feet and in air having 96 percent humidity and a temperature of 71° F. Such information may be included in travel related data collected by each aerial vehicle In accordance with the present disclosure, the aerial vehicles 110-1, 110-2, 110-3, 110-4 may be configured to periodically broadcast some or all of the data 150-1, 150-2, 150-3, 150-4 and/or provide the data to a central management system, which may operate on a computing system that is remote from each of the aerial vehicles and in communication with each of the aerial vehicles. The information or data 150-1, 150-2, 150-3, 150-4 may be broadcast and/or provided to the central management systems in real time or in near-real time while the aerial vehicles 110-1, 110-2, 110-3, 110-4 are in transit, or upon their arrival at their respective destinations.

As discussed further below, the aerial vehicles may be following flight plans between different source locations and destination locations and/or may be collecting travel related data for different areas. For example, the first aerial vehicle, 110-1 may be navigating a route between a source location and a destination location and, during route navigation, may collect travel related data along the planned travel path. As another example, the second aerial vehicle 110-2 may be navigating a route between a second source location and a second destination location but may have deviated from the route to explore other positions that are near the route, or that may be experiencing environmental conditions for which travel related data collection is desirable to explore boundaries of operational envelopes, etc. For example, the central management system may send instructions to the second aerial vehicle that cause the aerial vehicle to deviate from the scheduled flight plan and explore other areas. In other examples, the second aerial vehicle may autonomously decide, for example via randomly, to deviate from a scheduled flight plan to explore other areas.

Figure 2:
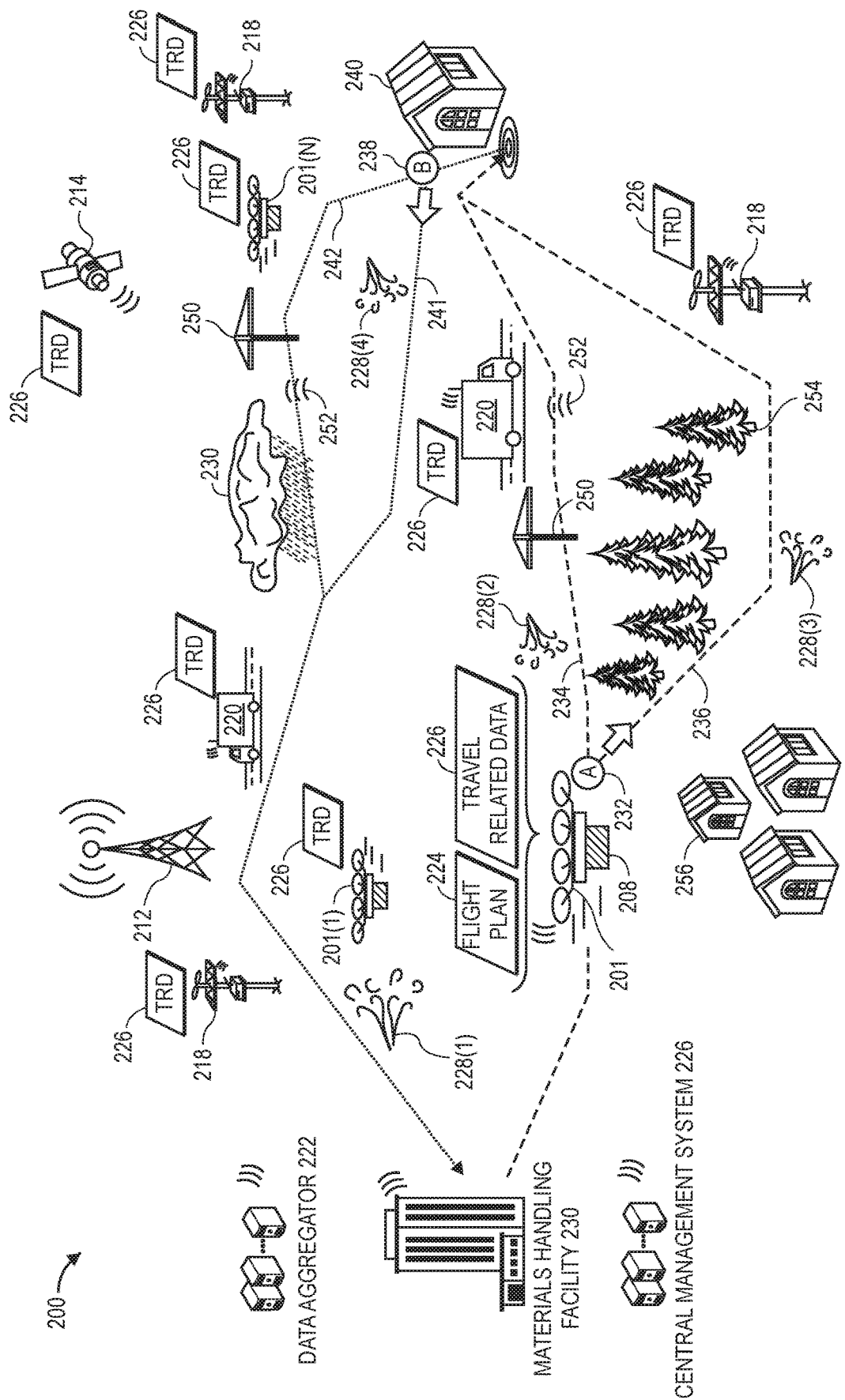
FIG. 2 depicts another block diagram of an unmanned aerial vehicle environment, according to some implementations.

FIG. 2 is a schematic diagram of an illustrative environment 200 that includes a materials handling facility 230 where an aerial vehicle, such as UAV 201, may originate a flight (e.g., a source location). The flight may be directed to a destination location 240, such as a location associated with a recipient of an item 208 that is transported by the UAV 201. The UAV 201 may receive at least some flight information and/or commands from a central management system 226. The central management system 226 may communicate with the UAV 201 via a wireless network, such as a network that utilizes one or more antennas 212 or satellites 214. The antennas 212 and satellites 214 may also provide other information, including travel related data 226 to various devices. The UAV 201 may also, at times, conduct autonomous flights. In various implementations, at least some autonomous flights may be conducted during intervals between communications from the central management system 226 and/or when communication with the central management system 226 is not available. In some implementations, the antennas 212, such as cell towers, may include travel related data stations that leverage a short message service (SMS) backchannel or other communication channel to communicate the travel related data to other entities and/or vehicles, such as the UAV 201.

In various implementations, the UAV 201 may sense and collect (e.g., utilizing various onboard sensors) travel related data during flight. For example, an obstacle sensor (e.g., an image sensor, distance sensor, etc.) may be utilized for determining the presence of an obstacle (e.g., construction crane, new building, tree, etc.), for which travel related data may be sensed and provided regarding GPS or other coordinates indicating the location of the obstacle, physical characteristics regarding the size and/or shape of the obstacle, etc. As another example, weather sensors (e.g., wind speed sensors, precipitation sensors, etc.) may sense and provide environmental condition data regarding wind speed, direction, amount of precipitation, etc., and other sensors may provide UAV operational characteristics of the aerial vehicle when exposed to the environmental condition.

The travel related data that is sensed and collected by the UAV 201 may be shared with the central management system 226, other UAVs, other vehicles, and/or other entities. The UAV 201 may also use this information locally to make ongoing flight decisions, etc. In various implementations, the travel related data may improve travel route optimization by enabling planning of faster and more efficient travel routes for UAV's to follow.

The UAV 201 may also exchange information with other UAVs 201(1)-201(N), such as travel related data collected from any of the UAVs 201(1)-201(N), as well as exchange information with other devices or vehicles, either directly or indirectly (e.g., through the central management system 226, etc.). In various implementations, other devices may include local data collection stations 218, ground vehicles 220, data aggregators 222, etc. The local data collection stations 218 may in some instances collect weather related data (e.g., wind speed, humidity, barometric pressure, visibility, illumination levels), data regarding obstacles, crowds, etc. For example, in instances where weather data is collected, the data collection stations 218 may include weather poles, weather balloons, and/or other devices that are stationed in the environment to directly sense and/or measure environmental conditions. In some instances, the local data collection stations 218 may also include other types of sensors (e.g., image sensors, distance detection sensors, etc.) for detecting other types of data (e.g., regarding obstacles, crowds of people, GPS signal strength, etc.).

The ground vehicles 220 may include vehicles equipped with travel related data sensors that capture some travel related data, such as data regarding obstacles, magnetic interference, wind speed, precipitation, fog or visibility, temperature, etc. In various implementations, the ground vehicles 220 may include land-based delivery vehicles or common-carrier vehicles that are used to deliver items to users. The data aggregators 222 may include resources or entities that combine data from multiple inputs (e.g., from the local data collection stations, from UAVs and/or from the vehicles), to create travel related data forecasts and/or provide travel related data for an area. The data aggregators 222 may be data reporting companies, cloud computing data aggregators, and/or other entities. In various implementations, various types of travel related data that may be collected by data aggregators or other entities may include digital terrain elevation data (DTED), local obstacle mapping, sense and avoid (SAA), local magnetic deviation, GPS signal quality areas, weather data (e.g., current and forecast), etc.

It will be appreciated that travel related data that is received from aerial vehicles, such as UAVs, may have various advantages. For example, a new obstacle 250 (e.g., a new construction crane) may be detected before updates on the presence of such an obstacle become publicly or otherwise available. This detection may be utilized to update an obstruction database. As another example, on board sensors of the UAV may be utilized to map geologic artifacts (e.g., magnetic disturbances due to ore deposits, etc.). Typically, such artifacts, disturbances, etc., are marked on various types of charts in a generic way, which may have less resolution or specificity than desired for planning flights of UAVs. In still other examples, travel related data collected by the UAV may indicate areas with recurring weather conditions (e.g., jet streams, turbulence, etc.) that are predictable and may be used in flight planning. In various implementations, additional data may be gathered by routing UAVs over such areas, for which the on board sensors of the UAVs may be utilized to measure the various deviations. Such measured deviations can be utilized to update the travel related data, which will allow subsequent UAVs flying in that area to take the deviations into account (e.g., for avoiding or preferring the areas, or generally being aware of the effect on various sensors and/or operational characteristics of the aerial vehicle in those areas and/or when exposed to those environmental conditions, etc.). In various implementations, the travel related data may be automatically collected and utilized for various optimizations that may be performed over short or long timeframes (e.g., with respect to scheduling, routing, long term planning, etc., for a materials handling facility, or an overall distribution system, etc.).

The UAV 201 may include a flight plan 224, which may be initially created by the central management system 226 and/or by the UAV 201 prior to flight of the UAV. The flight plan 224 is stored in memory of the UAV 201 and causes the UAV to fly to the destination 240, such as by traveling through waypoints tracked by a global positioning system (GPS) receiver of the UAV, or by other navigation methods (e.g., line of sight, etc.). The flight plan 224 may be initially created using travel related data, such as a travel related data provided by the data aggregator 222 and other sources. The flight plan 224 may include altitude information, environmental condition information, aerial vehicle operational parameters or characteristics, etc., and thus be multi-dimensional. For example, a flight plan may be created to cause a UAV to fly over or under certain areas or entities (e.g., an obstacle, a ground area with magnetic interference, a crowd of people, a weather system, etc.), as well as around or through certain areas depending on the flight capabilities of the UAV and other operating constraints.

During flight, the UAV 201 (and the other UAVs 201(1)-201(N)) may collect travel related data 226, which may be sensed by sensors onboard the UAV(s). The travel related data 226 may also include data from other devices, as discussed above, such as the data aggregator 222, the local data collection stations 218, the ground vehicles 220, etc., possibly via communications from the central management system 226 and/or direct communications from the sources of the travel related data. For example, the local data collection stations 218 may broadcast travel related data that can be received by the UAV 201 during flight. In various implementations, the travel related data may include any data related to the travel of UAVs 201s (e.g., as may be utilized for the planning of flights for 201s, etc.). For example, some travel related data may indicate obstacles (e.g., new or modified buildings, construction cranes, trees, etc.), phenomenon (e.g., magnetic interference), signal strength (e.g., GPS quality signal areas), weather conditions (wind speed, humidity, precipitation), etc. Some travel related data may be about the weather, such as winds 228, precipitation 230, fog or visibility, temperature, and/or other weather in the environment, as sensed by the various devices described above.

In various implementations, travel related data regarding obstacles may include GPS or other coordinates regarding the location of the obstacle, an identification of the obstacle (e.g., a particular building, bridge, construction crane, etc.), physical characteristics of the obstacle (e.g., height, width, etc.) and other relevant data regarding the obstacle. Depending on the size of the obstacle, different GPS coordinates may be utilized to indicate the perimeter and/or area of the obstacle (e.g., including the corners of a building, etc.). As another example, travel related data regarding the weather may include GPS or other coordinates regarding the location of the weather, a direction of movement, a size of area covered, wind speed, amount of precipitation, etc., as well as the operational characteristics (pitch, yaw, roll, heave, surge, sway, power requirements, sensor readings, etc.) of the UAV when experiencing the environmental condition. As another example, travel related data regarding a crowd of people may include GPS or other coordinates regarding a location, characteristics regarding the size of the crowd and/or area covered, indications if the crowd is increasing and/or decreasing, a direction of movement of the crowd (e.g., people running in a marathon race, a demonstration moving from location-to-location, etc.). As another example, travel related data regarding magnetic interference may include GPS or other coordinates regarding a location and/or area of the occurrence, the strength of the magnetic interference from a given source point, etc.

The UAV 201 and/or the central management system 226 may use the travel related data 226 to create and/or update the flight plan 224 and/or create a new flight plan for the UAV 201, which can replace/overwrite the flight plan 224. For example, the UAV 201 may include a flight plan that causes the UAV 201 to travel to a first waypoint "A" (i.e., waypoint 232). At or prior to arriving at the waypoint 232, the travel related data 226 may be used to update the flight plan (or create a new flight plan) to determine how best to travel to the next waypoint or the destination 240 based on the travel related data 226. For example, the flight plan 224 may, before an update, direct the UAV 201 along a travel route 234. However, based on the travel related data 226, the UAV 201 may instead be directed along a travel route 236. In some implementations, the UAV 201 may be directed along the travel route 236 by a flight controller without necessarily updating a flight plan or all of the waypoints of the flight plan. For example, the flight controller may decide to deviate from the flight plan and navigate along route 236 to explore and collect travel related data along route 236.

The travel route 236 may be selected instead of the travel route 234 based on various factors. For example, travel related data that indicates a new obstacle 250 (e.g., a new construction crane) and/or a new or increased source of magnetic interference 252 (e.g., due to ore deposits, etc.) along the travel route 234 may make the travel route 236 preferable. As another example, the travel related data may indicate directions of winds at particular locations, which may include a headwind 228(2) along the travel route 234 and a tailwind 228(3) along the travel route 236, which may make the travel route 236 preferable. In some implementations, travel routes may be selected based on known geographic features in an area, such as wind shadows caused by cliffs or tree lines (e.g., trees 254), convergence zones, downdrafts, and/or other known features and/or frequently occurring phenomenon. Some phenomenon may be correlated with geographic features to enable identification of other possible occurrences of the phenomenon, and the geographic features, respective locations, various measurements and other data regarding the phenomenon may be recorded as part of the travel related data.

As an example scenario, a data aggregator may have provided travel related data (e.g., indicating obstacles such as trees 254, weather such as wind 228(1) and/or a corresponding weather forecast, a local GPS signal strength, a magnetic interference, a construction activity, a crowd of people, etc.) on the basis of which the travel route 234 may have been originally planned and/or determined. In addition, an estimated travel time for the UAV 201 to deliver the item 208 to the delivery location 240 may have been originally determined based on the planned first travel route 234. After the first travel route 234 was planned, other UAVs flying through the area (e.g., UAV 201(1), UAV 201(N), etc.) may have more recently provided additional travel related data (e.g., indicating information that was not indicated by the original travel related data, such as regarding the obstacle 250, the magnetic interference 252, the winds 228(2) and 228(3), etc.). On the basis of the updated travel related data (e.g., indicating the obstacle 250, the magnetic interference 252, and/or the winds 228(2) and 228(3), etc.) as combined with the original travel related data (e.g., indicating the trees 254 and/or the wind 228(1), etc.), the second travel route 236 may have been planned and/or determined for the UAV 201. Correspondingly, an updated estimated travel time may have also been determined for the UAV 201 to deliver the item 208 to the delivery location 240, based on the travel route 236. In some instances, a user (e.g., at the delivery location 240) may be sent a notification regarding an updated estimated delivery time that is calculated based on the updated estimated travel time.

As another example scenario, the travel route 234 may have been planned for the UAV 201 by the central management system 226 based at least in part on travel related data (e.g., indicating the trees 254, the wind 228(1), etc.) that was stored in a memory of the central management system 226. During or after the flight of the UAV 201, a determination may have been made that the UAV 201 deviated from the planned travel route 234 to explore the area along route 236 and collect travel related data for that area. For example, the UAV may have deviated from the planned travel route 234 to explore the weather conditions, such as the wind 228(3) along route 236.

As part of the delivery of the item 208 to the location 240, or independent of that delivery, a flight plan for the UAV 201 may also or alternatively include travel from the location 240 to the materials handling facility 230. For example, the UAV 201 may also or alternatively perform an item return process, wherein the UAV 201 may acquire an item at the location 240 which a user is returning and which the UAV 201 is to deliver to the materials handling facility 230 (e.g., which may be designated as a delivery location for the returned item). As part of a flight plan, at or prior to a waypoint "B" (i.e., waypoint 238), a determination may be made if the UAV 201 should follow a travel route 241 or a travel route 242. Similar to the examples described above, in various implementations a travel route for the UAV 201 may be planned and/or determined based at least in part on travel related data that is received from multiple sources.

For example, one or more other UAVs 201(1)-201(N) may have previously attempted to travel along the travel route 242, but may have utilized sensors to detect and record travel related data regarding the weather condition 230, an obstacle 250 and/or magnetic interference 252. The travel related data may have been transmitted or otherwise provided to the central management system 226 and/or directly to the UAV 201. This travel related data (e.g., which indicates the location and/or characteristics of the weather condition 230, the obstacle 250, and/or the magnetic interference 252) may be utilized by the central management system 226 and/or the UAV 201 to plan and/or determine a travel route for the UAV 201. For example, based on the travel related data provided by the one or more other UAVs, in combination with travel related data that may be provided from other sources (e.g., a data aggregator which provides travel related data regarding the wind 228(4), the precipitation 230, etc.), the travel route 240 may be determined and/or selected over the travel route 242 for traveling back to the materials handling facility 230. As noted above, if the travel route 242 had previously been planned and/or determined for the UAV 201, the switch to the travel route 240 may have been based on updated travel related data (e.g., regarding the obstacle 250, the source of the magnetic interference 252, the precipitation 230, etc.) that may have been received from other UAVs and/or other sources.

In accordance with one or more implementations, the UAV 201 may include a flight plan that coordinates with one of the vehicles 220 that is used to transport the UAV 201 and/or the item 208 in a desired direction (e.g., for energy efficiency, safety, etc.). For example, for energy efficiency, a vehicle 220 may be utilized to transport the UAV into a headwind rather than causing the UAV to fly into the headwind. As another example, for safety, a vehicle 220 may be utilized to transport the UAV through an area where it may otherwise be dangerous for a UAV to fly (e.g., in strong winds, over a crowd of people, etc.). In one implementation, at or prior to reaching the waypoint 232, the UAV may coordinate with a vehicle and have the vehicle transport the UAV and/or the item 208 along a ground route (e.g., a road, etc.) in a similar direction as the route 234 (e.g., which may be subject to a strong headwind 228(2) as shown in FIG. 2, or may be over a crowd of people that has formed, etc.). The vehicle 220 may shuttle the UAV 201 to a location (e.g., which may be upwind), which may allow the UAV to primarily conduct flight with a tailwind, or which may be away from a crowd of people, etc.). In some implementations, land vehicles may be stationed at different locations in the environment 200 to transport UAVs and/or items accordingly. In various implementations, the UAV 201 may selectively coordinate with the land vehicles for this purpose, such as when the travel related data 226 indicates that use of a land vehicle is prudent. For example, when the travel related data 226 indicates a presence of high gusty winds, or a crowd of people, the UAV may land and coordinate with a land vehicle to accomplish a next segment of the travel route and/or complete the delivery of the item 208 to the destination 240.

In various implementations, the methods and techniques described above with respect to FIG. 2 may be utilized for various types of applications. For example, if a product manager (e.g., who is associated with the materials handling facility 230 or other entity, etc.) desires to expand into a new marketplace within the environment 200, the central management system 226 may be queried with regard to a proposed area of operations. In response to the query, stored travel related data and associated analysis may be accessed for providing various types of information (e.g., what travel related data will affect delivery operations in the proposed area, how many deliveries are able to made in the proposed area based on the different periodic variances in the travel related data, how many operating hours/days in the proposed area are typically available depending on the variances in the travel related data, etc.).

The various implementations, different types of forecasts may be made regarding the travel related data (e.g., forecasts regarding weather, obstacles being added or removed, crowds forming or disbursing, GPS signal strength increasing or decreasing, etc.) Such forecasts may be utilized for determining various factors (e.g., how many UAVs are needed at the materials handling facility 230, how quickly items can be delivered from the materials handling facility 230, etc.). As one example, if a forecast indicates a strong headwind or tailwind in a particular area, flight plans may be determined that either prefer the area (tailwind) or avoid the aerial (headwind) to improve the operational efficiency of the aerial vehicle. In other examples, different types of aerial vehicles may be selected based on predications made from travel related data. For example, if precipitation is anticipated, aerial vehicles that are designed to operate in high precipitation may be selected. As another example, if high winds are expected, aerial vehicles that have increased stability due to their size and/or propulsion mechanism configurations may be selected.

With respect to such forecasts, it will be appreciated that predictions may be made for various time periods in the future. For example, with regard to an upcoming delivery, the travel related data may be utilized to forecast what conditions may be like 30 minutes into the future. In contrast, with respect to long range planning, the travel related data may be utilized to forecast what the general conditions are expected to be like days, months, years into the future in the environment 200 or in other environments, with regard to the planning and optimization of various operations for the materials handling facility 230 and/or flight planning.

Figure 3:
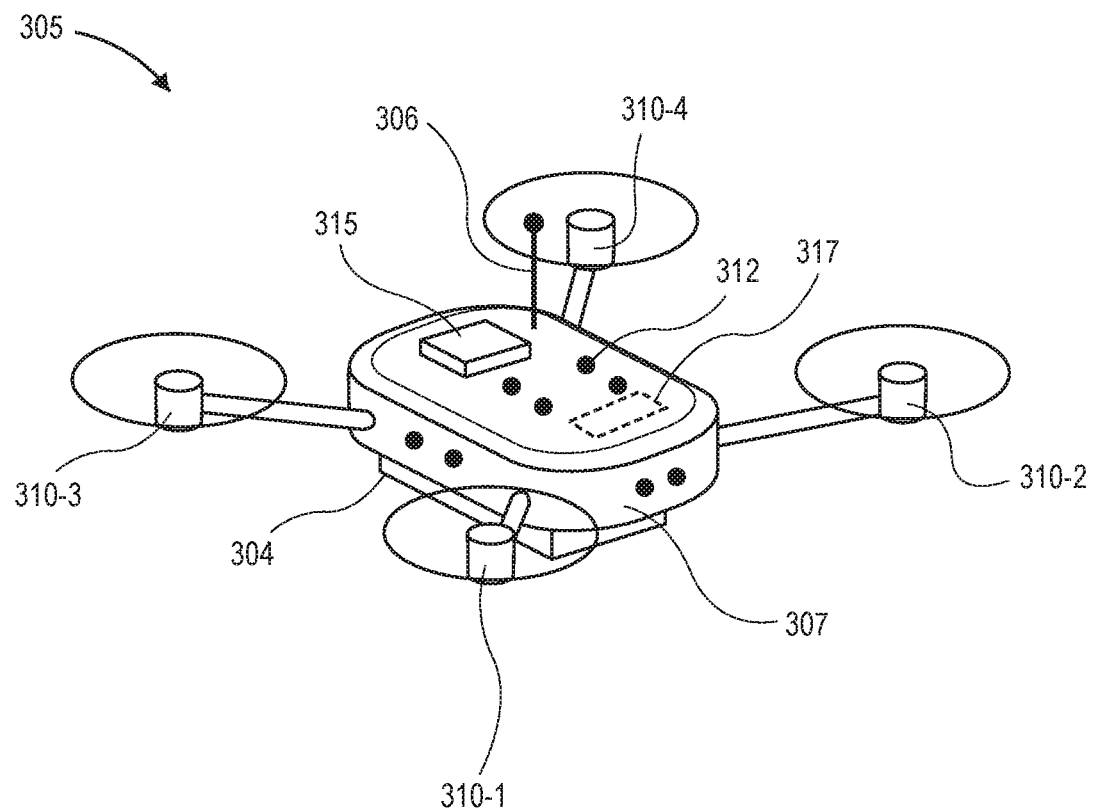
FIG. 3 depicts a block diagram of an unmanned aerial vehicle, according to some implementations.

FIG. 3 is an example aerial vehicle 305, in accordance with described implementations.

As illustrated in FIG. 3, an aerial vehicle 305 may include a frame or body 307, and a plurality of propulsion mechanisms, such as motors and propellers 310, coupled to the frame or body 307. The frame or body 307 may be formed of any suitable materials, such as carbon fiber, metals, plastics, or combinations thereof. In addition, the motors and propellers 310 may be coupled to the frame or body 307, or via one or more motor arms extending from the frame or body 307. The motors may be any suitable motors for rotating respective propellers 310 to generate thrust to lift or maneuver at least a portion of the aerial vehicle 305. The propellers 310 may be formed of any suitable materials, such as carbon fiber, metals, plastics, or combinations thereof. Further, the aerial vehicle 305 may also include a control system 315 that may control operation and navigation of the aerial vehicle 305, including aspects related to operation of the motors and propellers 310.

Although FIG. 3 shows an aerial vehicle having a particular shape, size, number of motors and propellers 310-1, 310-2, 310-3, 310-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In addition, the aerial vehicle 305 may include an analysis unit 317 that includes one or more processors that may process or analyze travel related data collected by sensors 312 of the aerial vehicle and/or received from other sources. The analysis unit 317 may be included as part of the control system 315 or independent of the control system 315.

The aerial vehicle 305 may also include an antenna 306 or other wireless transmission mechanism to enable wireless communication between the aerial vehicle and other computing sources, such as computing sources that provide navigation routes, other travel related data, source locations and/or destination locations, etc. Likewise, the aerial vehicle 305 includes one or more sensors 312, such as a camera, ranging sensor, altimeter, barometer, etc., that may be used by the control system 315 and/or the analysis unit 317 to navigate the aerial vehicle 305 and/or to obtain sensor data representative of the environment.

The aerial vehicle 305 may also include a payload engagement component 304 that is operable to engage, carry, and/or disengage a payload, such as an item, for aerial transport by the aerial vehicle 305.

While the examples discussed herein describe implementations with respect to aerial vehicles, it will be appreciated that the disclosed implementations may also be applied to other forms of vehicles. For example, the disclosed implementations may be used with aerial vehicles, unmanned aerial vehicles, ground based vehicles, unmanned ground based vehicles, water based vehicles, unmanned water based vehicles, amphibious vehicles, and/or unmanned amphibious vehicles. As will be appreciated, different vehicles and/or different types of vehicles may operate with different degrees of freedom.

Figure 4:
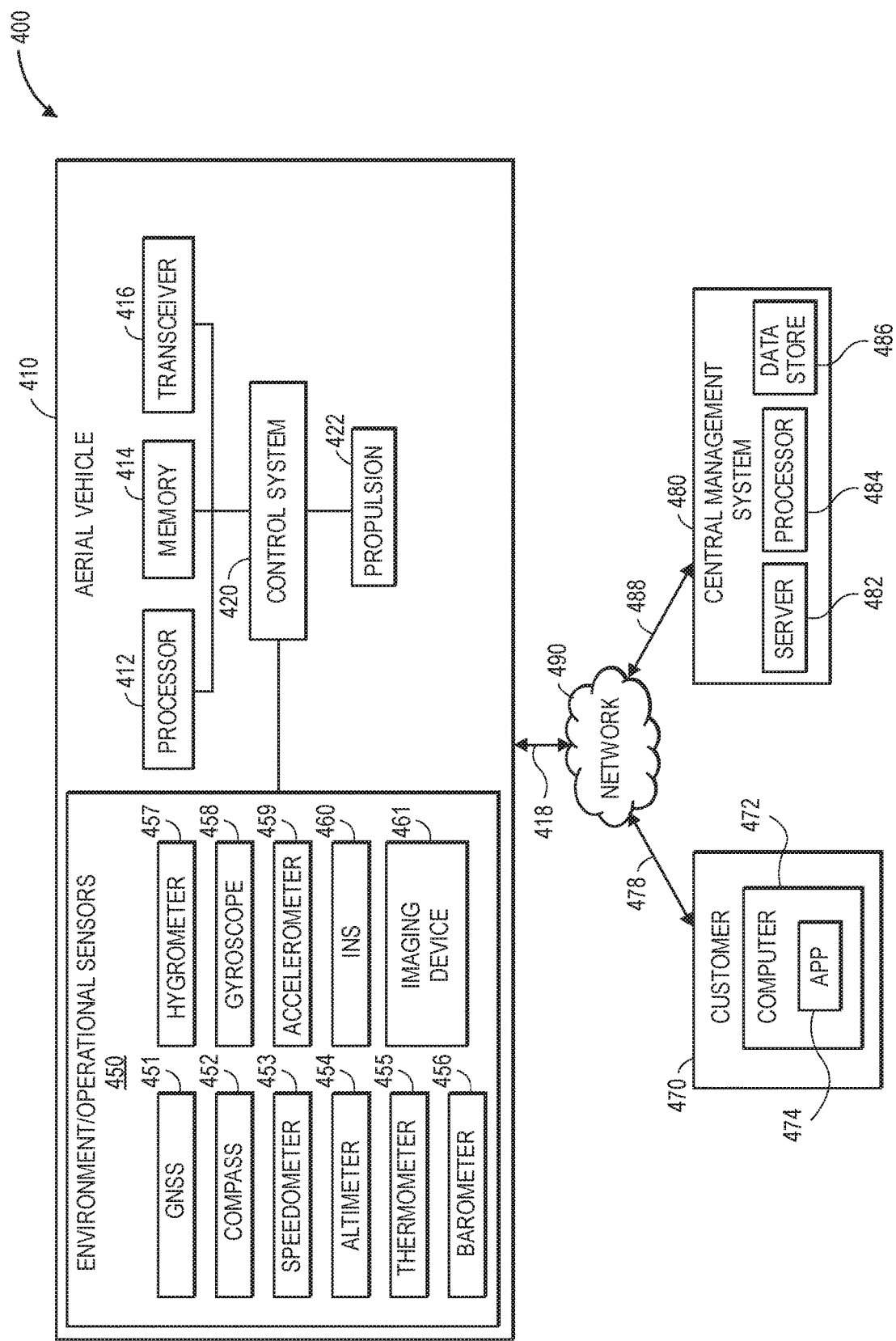
FIG. 4 is a block diagram of one system for autonomous collection of travel related data, in accordance with disclosed implementations.

FIG. 4 is a block diagram of one system 400 for autonomous collection of travel related data, in accordance with disclosed implementations.

The system 400 includes an aerial vehicle 410, a customer 470 and a central management system 480 connected to one another over a network 490, which may include the Internet, in whole or in part. As is shown in FIG. 4, the aerial vehicle 410 includes a processor 412, a memory 414 and a transceiver 416. The aerial vehicle 410 further includes a control system 420, a plurality of propulsion mechanisms 422, and one or more environmental and/or operational sensors 450, generally referred to herein as sensors 450.

The processor 412 may be configured to perform any type or form of computing function associated with the operation of the aerial vehicle 410, including but not limited to the execution of one or more machine learning algorithms or techniques, generation of travel related data, flight path planning, etc. The processor 412 may also be configured to execute any other algorithms or techniques (e.g., object detection or recognition algorithms or techniques) associated with one or more applications, purposes or functions, e.g., to select at least one of a course, a speed, an altitude or an orientation (e.g., one or more of a yaw angle, a pitch angle or a roll angle) for the safe operation of the aerial vehicle 410. For example, the processor 412 may be configured to control any aspects of the operation of the aerial vehicle 410 and the one or more computer-based components thereon, including but not limited to the propulsion mechanisms 422 and/or the sensors 450. The processor 412 may control the operation of one or more control systems or modules, such as the control system 420, for generating instructions for conducting operations of one or more of the propulsion motors 422 and/or the sensors 450, and/or for interpreting information or data captured using one or more sensors 450. Such control systems or modules may be associated with one or more other computing devices or machines, and may communicate with the central management system 480 or one or more other computer devices or aerial vehicles over the network 490, as indicated by line 418, by the sending and receiving of digital data.

The sensors 450 may be any one or more of a variety of environmental and/or operational sensors. For example, the sensors may include, but are not limited to, any one or more of a Global Navigation System ("GNSS") 451, a compass 452, a speedometer 453 or pitot tube, an altimeter 454, a thermometer 455, a barometer 456, a hygrometer 457, a gyroscope 458, an accelerometer 459, an Inertial Navigation System ("INS") 460, an imaging device 461, etc. Still other examples of environmental and/or operational sensors include but are not limited to sound navigation ranging sensors (SONAR), three-dimensional laser scanning (e.g. LIDAR), stereo imaging, ultrasonic, etc. As discussed herein, any one or more of the sensors 450 may be utilized to collect environmental condition data and/or aerial vehicle operational data that is utilized and/or included in travel related data.

The processor 412 may be a uniprocessor system including one processor, or a multiprocessor system including several processors (e.g., two, four, eight, or another suitable number), and may be capable of executing instructions. For example, in some embodiments, the processor 412 may be a general-purpose or embedded processor unit such as a CPU or a GPU having any number of instruction set architectures (ISAs), such as the x86, PowerPC, SPARC, or MIPS ISAs, or any other suitable ISA. Where the processor 412 is a multiprocessor system, each of the processors within the multiprocessor system may operate the same ISA, or different ISAs.

Additionally, the aerial vehicle 410 further includes one or more memory or storage components 414 (such as databases or data stores) for storing any type of information or data, e.g., instructions for operating the aerial vehicle 410, or information or data captured during operations of the aerial vehicle 410. For example, the memory 414 may be configured to store one or more environmental conditions and/or travel related data collected during aerial vehicle navigation. The memory 414 may be configured to store executable instructions, imaging data, flight routes or paths, flight control parameters, sound intensities or frequency spectra and/or other data items accessible by or to the processor 412. The memory 414 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight routes or paths, flight control parameters, sound intensities or frequency spectra and/or other data items may be received or sent via the transceiver 416, e.g., by transmission media or signals, such as electrical, electromagnetic, or digital signals, which may be conveyed via a communication medium such as a wired and/or a wireless link.

The transceiver 416 may be configured to enable the aerial vehicle 410 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 490 or directly. The transceiver 416 may further include or be in communication with one or more input/output (or "I/O") interfaces, network interfaces and/or input/output devices, and may be configured to allow information or data to be exchanged between one or more of the components of the aerial vehicle 410, or to one or more other computer devices or systems (e.g., other aerial vehicles, not shown) via the network 490. For example, in some embodiments, the transceiver 416 may be configured to coordinate I/O traffic between the processor 412 and one or more onboard or external computer devices or components, e.g., the propulsion mechanism 422 and/or sensors 450. The transceiver 416 may perform any necessary protocol, timing or other data transformations in order to convert data signals from a first format suitable for use by one component into a second format suitable for use by another component. In some embodiments, the transceiver 416 may include support for devices attached through various types of peripheral buses, e.g., variants of the Peripheral Component Interconnect (PCI) bus standard or the Universal Serial Bus (USB) standard. In some other embodiments, functions of the transceiver 416 may be split into two or more separate components, or integrated with the processor 412.

The control system 420 may include one or more electronic speed controls, power supplies, navigation systems and/or payload engagement controllers for controlling aspects of the operation of the aerial vehicle 410, as desired. For example, the control system 420 may be configured to cause or control the operation of one or more of the propulsion mechanisms and/or sensors 450 such as to cause one or more of the propulsion mechanisms 422 to rotate propellers at desired speeds, to cause the sensors 450 to capture information or data regarding altitudes, positions, environmental conditions, aerial vehicle speeds, etc., and to cause one or more of the imaging devices 461 to capture any imaging data (e.g., still or moving images) as well as any associated audio data and/or metadata. The control system 420 may further control any other aspects of the aerial vehicle 410, including but not limited to the operation of one or more control surfaces such as wings, rudders, ailerons, elevators, flaps, brakes, slats or other features within desired ranges, or the enactment with or release of one or more items by one or more engagement systems. In some embodiments, the control system 420 may be integrated with one or more of the processor 412, the memory 414 and/or the transceiver 416.

The aerial vehicle 410 may include any number of propulsion mechanisms 422 of any kind. For example, one or more of the propulsion mechanisms 422 may be aligned or configured to provide forces of lift to the aerial vehicle 410, exclusively, while one or more of the propulsion mechanisms 422 may be aligned or configured to provide forces of thrust to the aerial vehicle 410, exclusively. Alternatively, one or more of the propulsion mechanisms 422 may be aligned or configured to provide forces of lift and forces of thrust to the aerial vehicle 410, as needed. For example, the propulsion mechanisms 422 may be fixed in their orientation on the aerial vehicle 410, or configured to vary their respective orientations, e.g., a tilt-rotor aircraft. Moreover, the propulsion mechanisms 422 may be aligned or configured to operate with different capacities or ratings, or at different speeds, or coupled to propellers having different sizes and shapes. Additionally, one or more of the propulsion mechanisms 422 may be an electric motor, e.g., a brushless DC multi-phase motor, and one or more of the propulsion motors 422 may be a gasoline-powered motor.

Each of the propulsion mechanisms 422 may be coupled to one or more propellers (or rotors or rotatable systems) having a plurality of shaped blades joined to a hub or boss. For example, each of such propellers may be rotatably mounted to a mast or shaft associated with a respective one of the propulsion mechanisms 422 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The customer 470 may be any entity or individual that wishes to download, purchase, rent, lease, borrow or otherwise obtain items (which may include goods, products, services or information of any type or form) from any source, e.g., for delivery by one or more of the aerial vehicles 410. The customer 470 may utilize one or more computers 472 (e.g., a smartphone, a tablet computer, a laptop computer, a desktop computer, or computing devices provided in wristwatches, televisions, set-top boxes, smart speakers, automobiles or any other appliances or machines), or any other like machine, that may operate or access one or more software applications 474, such as a web browser or a shopping application, and may be connected to or otherwise communicate with the aerial vehicle 410, the central management system 480, or one or more other computer systems through the network 490, as indicated by line 478, by the transmission and receipt of digital data.

The central management system 480 includes one or more physical computer servers 482 having one or more computer processors 484 and any number of data stores 486 (e.g., databases) associated therewith, as well as provided for any specific or general purpose. For example, the central management system 480 of FIG. 4 may be independently provided for the exclusive purpose of receiving, analyzing or storing travel related data and determining flight plans based on received travel related data. Alternatively, the central management system 480 may be provided in connection with one or more physical or virtual services that are configured to receive, analyze or store such information or data, or other information or data, as well as one or more other functions. The central management system 480 may be associated with one or more electronic marketplaces (e.g., online marketplaces), physical (e.g., bricks-and-mortar) marketplaces, fulfillment centers, materials handling facilities, warehouses, distribution centers, cross-docking facilities, order fulfillment facilities, packaging facilities, shipping facilities, rental facilities, libraries, retail stores or establishments, wholesale stores, museums, or other facilities. Alternatively, the central management system 480 may be provided separate and apart (e.g., independent) any such facilities.

The servers 482 may be connected to or otherwise communicate with the processors 484 and the data stores 486, which may store any type of travel related data, including but not limited to environmental condition data and/or aerial vehicle operational data. The servers 482 may be configured to execute one or more algorithms to generate routes, paths, and/or flight plans based on the received travel related data that are to be traveled by aerial vehicles.

In some embodiments, the servers 482 may be configured to generate models in the form of two-dimensional or three-dimensional representations of flight plans at a plurality of locations over time, or to modify such representations over time, or in response to variations in travel related data. Furthermore, in some embodiments, the servers 482 may be configured to calculate predicted aerial vehicle operational characteristics that will result from following a flight plan and based on the anticipated environmental conditions to be encountered during navigation of the flight plan.

The servers 482 and/or the computer processors 484 may also connect to or otherwise communicate with the network 490, as indicated by line 488, through the sending and receiving of digital data. For example, the central management system 480 may include any facilities, stations or locations having the ability or capacity to receive and store information or data in one or more data stores, e.g., from the aerial vehicle 410, from one or more other aerial vehicles, or from one or more other external computer systems (not shown) via the network 490. In some embodiments, the central management system 480 may be provided in a physical location. In other such embodiments, the central management system 480 may be provided in one or more alternate or virtual locations, e.g., in a "cloud"-based environment. In still other embodiments, the central management system 480 may be provided onboard one or more aerial vehicles, including but not limited to the aerial vehicle 410.

The network 490 may be any wired network, wireless network, or combination thereof, and may comprise the Internet in whole or in part. In addition, the network 490 may be a personal area network, local area network, wide area network, cable network, satellite network, cellular telephone network, or combination thereof. The network 490 may also be a publicly accessible network of linked networks, possibly operated by various distinct parties, such as the Internet. In some embodiments, the network 490 may be a private or semi-private network, such as a corporate or university intranet. The network 490 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 412, the servers 482 and/or the processors 484 may be configured to execute one or more calculations regarding routes or paths to be traveled by the aerial vehicle 410, In some embodiments, the processor 412, the servers 482 and/or the processors 484 may be configured to determine an optimal path or route between two locations for the execution of a given mission or task by the aerial vehicle 410 or one or more other aerial vehicles (not shown), such as according to one or more traditional shortest path or shortest route algorithms such as Dijkstra's Algorithm, Bellman-Ford Algorithm, Floyd-Warshall Algorithm, Johnson's Algorithm or a hub labeling technique. The processor 412, the servers 482 and/or the processors 484 may determine an optimal path or route based on any factor or element, including but not limited to the travel related data, any costs associated with traveling on the paths, any energy to be expended by travel on the paths, or any changes in energy resulting from changes in one or more of such paths, or from a model (e.g., a map or other cartographic representation) of flight exposure, or any other intrinsic or extrinsic factors.

In some embodiments, the processor 412 and/or the server 482 may be configured to execute one or more machine learning systems or techniques. For example, in some embodiments, an artificial neural network or other machine learning system or technique may be trained to receive inputs in the form of information or data regarding travel related data collected within one or more regions, and to generate paths or routes, or modifications to paths or routes, based on outputs generated in response to such inputs. In some embodiments, the inputs may include, but are not limited to, environmental conditions and corresponding operational characteristics experienced by aerial vehicles of different vehicle types when encountering the environmental conditions. In some other embodiments, the inputs may further include information or data regarding surface features, topography, or terrain features at the one or more locations. In accordance with the present disclosure, an artificial neural network or other machine learning system may be trained in a supervised or unsupervised manner, and may include any number of neurons in any number of layers, including an input layer, an output layer, and one or more intervening hidden layers. Each of the neurons in a layer within a neural network may receive an input and generate an output in accordance with an activation function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system, such as an artificial neural network, may be further trained using any information, data or metadata in accordance with embodiments of the present disclosure.

The aerial vehicle 410 and/or the central management system 480 may use any web-enabled or Internet applications or features, or any other client-server applications or features including E-mail or other messaging techniques, to connect to the network 490, or to communicate with one another. For example, the aerial vehicle 410 may be adapted to transmit information or data in the form of synchronous or asynchronous messages to the central management system 480 or to any other computer device (e.g., to one or more other aerial vehicles) in real time or in near-real time, or in one or more offline processes, via the network 490. Those of ordinary skill in the pertinent art would recognize that the aerial vehicle 410, the computer 472 or the central management system 480 may operate or be operated by any of a number of computing devices that are capable of communicating over the network, including but not limited to set-top boxes, mobile devices, laptop computers, desktop computers, smart speakers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 412, the servers 482 and/or the processors 484, or any other computers or control systems utilized by the aerial vehicle 410 or the central management system 480 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the functions described herein as being performed or executed by one or more of the processor 412, the memory 414, or the control system 420 of the aerial vehicle 410 may be performed or executed by one or more of the server 482, the processor 484 or the data store 486, or vice versa, e.g., by the sending and receiving of digital data over the network 490.

Figure 5:
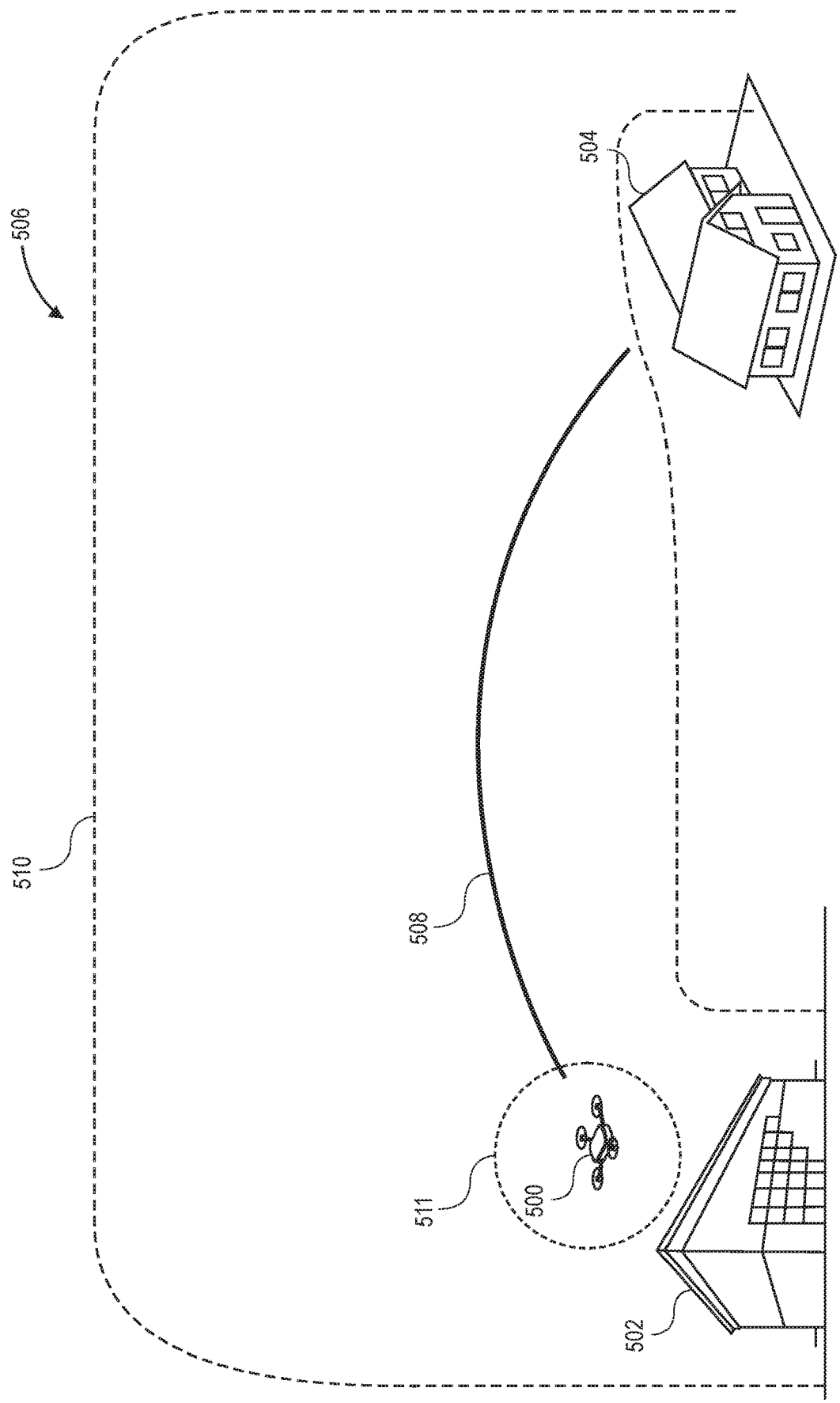
FIG. 5 depicts a block diagram of a navigation route of an aerial vehicle between a source location and a destination location, according to some implementations.

FIG. 5 depicts a block diagram 506 of a navigation route 508 of an aerial vehicle 500 between a source location 502 and a destination location 504, according to some implementations. As illustrated, in some implementations, a navigation route, which may be indicated in a flight plan, may be planned within an operational envelope 510 or indication of a maximum range around a flight navigation route 508 within which the aerial vehicle may safely operate. For example, a flight plan may specify one or more positional coordinates for aerial navigation (e.g., longitude, latitude, altitude) and an operational envelop that specifies an amount of allowable deviation in any direction from the positional coordinates. In other examples, the flight plan may indicate one or more waypoints between a source location 502 and a destination location 504 and the operational envelope 510 may indicate an area between the source location 502 and the destination location that is available or safe for navigation by the aerial vehicle 500.

The operational envelope 510 may vary based on, for example, information known about the environment in which the aerial vehicle is operating. For example, the operational envelope 510 may include any area or region that is free of obstacles or other objects that are within the area. In other examples, the operational envelope 510 may indicate areas in which the aerial vehicle cannot operate. For example, the operational envelope 510 may eliminate or exclude no-fly zones, areas with detected objects, altitudes above or below specified limits, etc.

The aerial vehicle may also include or be associated with a flight envelope 511. The flight envelope indicates a minimum required operational area necessary for the aerial vehicle to safely operate. The flight envelope 511 may vary based on, for example, the aerial vehicle type, the payload carried by the aerial vehicle, the environmental conditions, etc. Likewise, the flight envelope 511 may change or vary during navigation based on, for example, changing environmental conditions. Likewise, as discussed further below, the flight envelope may be determined in whole or in part based on travel related data collected during navigation of aerial vehicles of the aerial vehicle type as those vehicles encounter different environmental characteristics.

For the aerial vehicle to safely navigate, the flight envelope must be less than or equal in size to the operational envelope. In the example illustrated in FIG. 5, the aerial vehicle is able to operate within any portion of the operational envelope as it navigates between the source location 502 and the destination location 504. However, the aerial vehicle is not allowed to deviate from the flight path 508 to an extent that would cause a portion of the flight envelope to exceed the boundaries of the operational envelope 510.

In some implementations, due to changing environmental conditions, the aerial vehicle may not be able to continue navigation. For example, if an off-normal condition of high wind arises, which results in the flight envelope expanding to a dimension that is larger than the operational envelope 510, the aerial vehicle 500 may have to abort the flight and/or determine another route within the operational envelope 510, such as a higher or lower altitude, that does not result in the flight envelope 511 around the aerial vehicle exceeding the operational envelope 510. An "off-normal condition," as used herein, refers to any condition for which a flight envelope does not exist for an aerial vehicle type and/or for which travel related data has not been collected.

In other implementations, the aerial vehicle may encounter off-normal conditions, such as high winds, high precipitation, dense fog, etc., for which a flight envelope has not been developed and/or for which travel related data does not exist. In such an example, the aerial vehicle 500 may be intentionally positioned in the off-normal condition so that environmental condition data and corresponding aerial vehicle operational data may be collected as travel related data and used to adjust or create a flight envelope 511 for the vehicle type and the corresponding environmental conditions.

In still other examples, in some instances when the environmental conditions are stable or normal (e.g., wind below 5 miles per hour) the aerial vehicle may be instructed to explore the boundaries of portions of the operational envelope 510. For example, if a portion of a boundary of an operational envelope 510 is due to unknown portions of the environment and/or potential for objects, under normal environmental conditions, the aerial vehicle 500 may explore those boundaries to determine if the operational envelope may be expanded. An example of such exploration and potential expansion is discussed further below with respect to FIG. 6.

Figure 6:
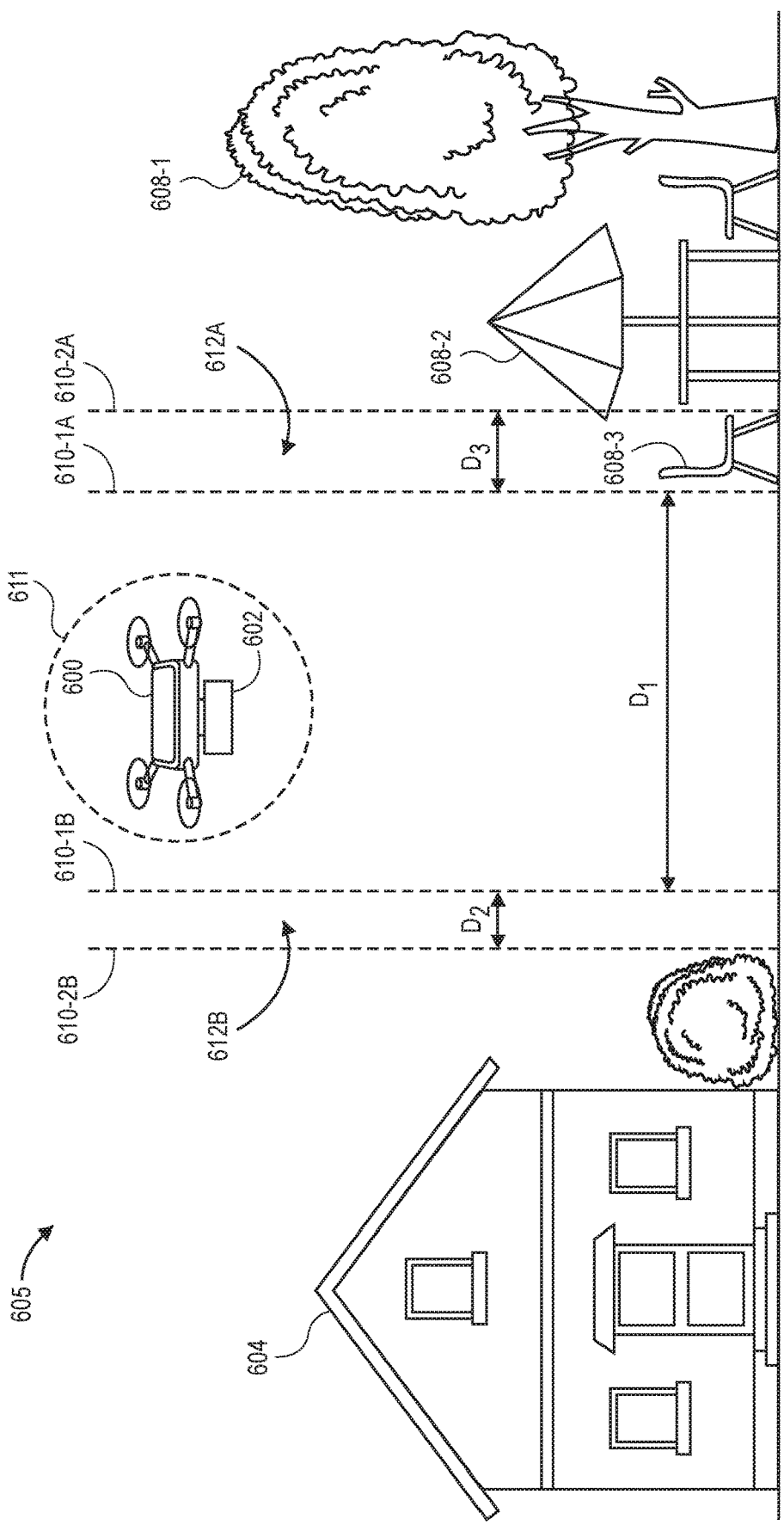
FIG. 6 depicts a block diagram of a landing area at a destination location, according to some implementations.

FIG. 6 depicts a block diagram of a landing area 605 at a destination location 604, according to some implementations. As discussed above, the aerial vehicle 600 of a particular aerial vehicle type and during particular environmental conditions has a corresponding flight envelope 611 that specifies a minimum operational distance for aerial vehicle operation. Likewise, in this example, the operational envelope, illustrated by dashed lines 610-1A and 610-1B, specifies the current operational envelope boundaries within which the aerial vehicle must operate. During delivery of a package 602 by the aerial vehicle, the aerial vehicle may navigate anywhere between the boundaries 610-1A, 610-1B of the operational envelope provided that the flight envelope 611 does not exceed those boundaries. In this example, the operational boundaries 610-1A and 610-1B are specified due to objects, such as trees 608-1, umbrellas 608-2, chairs 608-3, houses 604, etc. being present at the destination location. As such, it may be desirable to periodically explore those object(s) based operational boundaries, referred to herein as learned boundaries, to determine if the object are still present and, if not, expand the boundary.

Accordingly, during some environmental conditions, such as low wind (below 5 miles per hour), the aerial vehicle 611 may be allowed to explore the boundary edges 610-1A and 610-1B of the operational envelope to determine if the boundary of the operational envelope can be expanded. In this example, the aerial vehicle may navigate into the buffer 612A and collect sensor data (operational and/or environmental) relating to the area within buffer 612A to determine if the aerial vehicle can safely navigate within that expanded boundary. In this example, the aerial vehicle will detect a chair 608-3 and determine that the boundary 610-1A should not be expanded. In comparison, the aerial vehicle 600 may also navigate into buffer 612B and determine that no objects or other obstacles are present within the buffer area 612B and that the operational boundary 610-1B may be expanded to boundary 610-2B, thereby increasing the overall operational boundary within which the aerial vehicle may operate.

Expanding the operational boundary through periodic exploration under normal environmental conditions allows for greater flexibility in future delivers to the location. for example, with the previous operational boundary specified by dashed lines 610-1A and 610-1B, the flight envelope 611 of the aerial vehicle 600 may only allow delivery during low winds. For example, the flight envelope 611 may expand if the winds exceed ten miles per hour such that the size of the flight envelope exceeds the area or distance (D 1) between operational boundaries 610-1A and 610-1B and as a result the aerial vehicle 600 would not be able to deliver the package 606 during environmental conditions in which the wind exceeds ten miles per hour. In comparison, with the expanded operational boundaries specified by dashed lines 610-1A and 610-2B, the flight envelope for the aerial vehicle may be less than or equal in size for environmental conditions up to fifteen miles per hour. As a result, item delivery by the aerial vehicle during different environmental conditions is increased.

While the above example of an operational envelope and flight envelope are discussed primarily in two-dimensions, it will be appreciated that each of the operational envelope and flight envelope are multi-dimensional and include at least three-dimensional positions or boundary information. In other examples, one or both of the operational envelope and/or the flight envelope may include other dimensional information such as a maximum velocity or noise levels at different regions or areas within the operational envelope.

Figure 7:
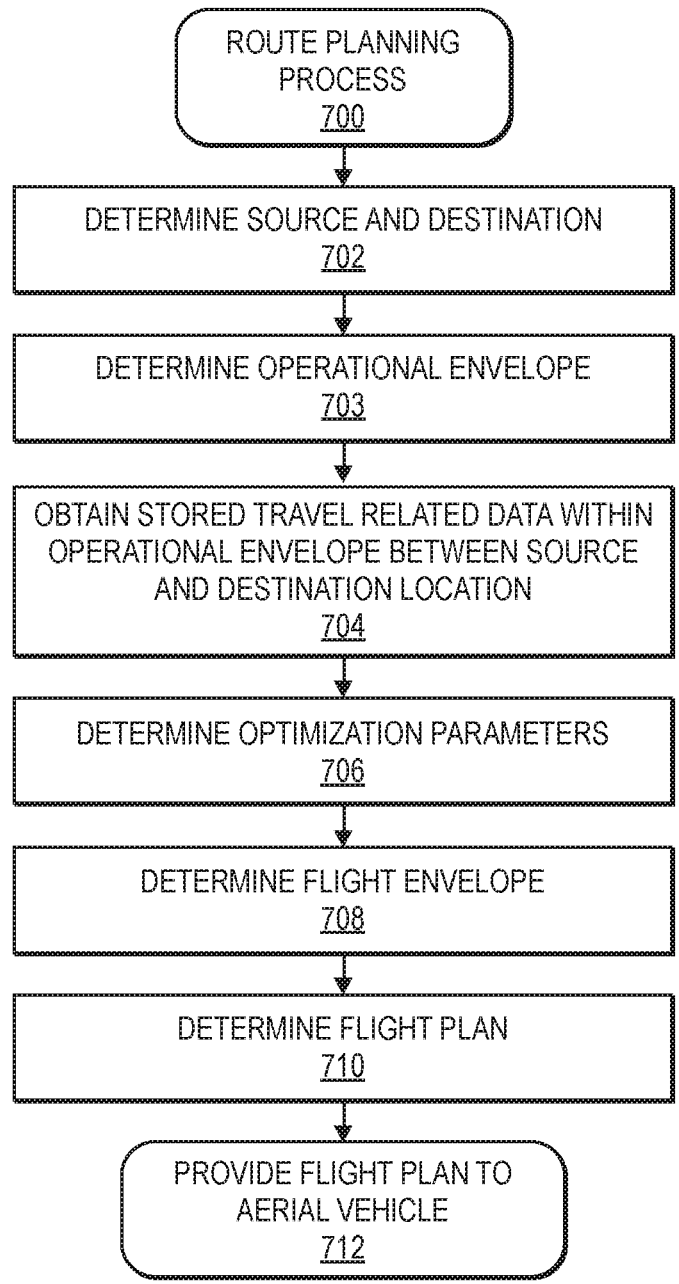
FIG. 7 is a flow diagram of an example route planning process, according to some implementations.

FIG. 7 is a flow diagram of an example route planning process 700 based on collected travel related data, according to some implementations. The example process 700 begins by determining or receiving an indication of a source location and a destination location, as in 702. For example, if a user purchases an item from an electronic commerce website for delivery to their home, the source location may be a fulfillment center that stores inventory of the item and the destination location may be any location specified by the user for delivery of the item (e.g., home address, business address, current location of the user, etc.). In other examples, the source location may be a current location of the aerial vehicle and the destination location may be a waypoint or other designated position to which the aerial vehicle is to navigate.

Based on the determined source location and destination location, an operational envelope that encompasses both the source location and the destination location is determined, as in 703. As discussed above, the operational envelope indicates a maximum area within which the aerial vehicle may operate. The boundaries of the operational envelope may be based on different factors which, in some implementations, indicate whether those boundaries may be explored or expanded. For example, permanent boundaries for an operational window may correspond to no-fly zones (e.g., hospitals, airports, schools), maximum altitudes, minimum altitudes, etc., and may not be explorable or adjustable. In comparison, learned operational boundaries may correspond to boundaries that have been created based on known or expected environmental conditions, such as obstacles, adverse weather conditions, etc. In some implementations, operational boundaries may be periodically explored by aerial vehicles to determine if the boundary may be adjusted.

The example process 700 may also obtain stored travel related data that has previously been collected and stored for areas within the operational envelope, as in 704. As discussed above, as the aerial vehicle, other vehicles, data aggregators, weather stations, etc., collect data the data may be stored and utilized in route planning. For example, each time an aerial vehicle navigates through at least a portion of an operational envelope, travel related data may be collected by the aerial vehicle, associated with positions and/or states of the aerial vehicle and maintained in a data store. If the positions are within the operational envelope, the travel related data may be obtained by the example process 900.

In some examples, the travel related data may decay over a period of time such that more recent travel related data is provided a higher weighting than older travel related data. Likewise, in some implementations, travel related data may correspond to different seasons, events, and/or other temporal instances, and only be valid and considered by the example process during those different temporal instances. For example, travel related data may exist for winter months and different travel related data may exist for summer months.

The example process 700 may also determine one or more optimization parameters for which the route or flight plan is to be based, as in 706. Optimization parameters may include any one more parameters for which aerial vehicle navigation is to be optimized. For example, and not by way of limitation, optimization parameters for a flight may include at least one of a safety of a human, a safety of the aerial vehicle, a speed of the aerial vehicle, an altitude of the aerial vehicle, an energy consumption of the aerial vehicle, a power requirement of the aerial vehicle, a noise level of the aerial vehicle, a flight mode (e.g., horizontal flight mode, vertical flight mode) of the aerial vehicle, a pose of the aerial vehicle, control surface positions of control surfaces on the aerial vehicle, operational parameter of a sensor, etc.

Based on the obtained travel related data, an anticipated flight envelope may be determined for the aerial vehicle or aerial vehicle type that is to navigate between the source location and the destination location, as in 708. In some instances, the flight envelope may be a largest envelope for the aerial vehicle type that may result from environmental conditions indicated in the obtained travel related data. In other examples, multiple different flight envelopes may be determined for the aerial vehicle type based on the different environmental conditions indicated by the obtained travel related data.

Based on the operational envelope, the optimization parameters, and the determined flight envelope(s) for the aerial vehicle type, a flight plan is determined for the aerial vehicle, as in 710. For example, a flight plan may specify a series of way points within the operational envelope that are to be navigated by the aerial vehicle and that will result in the flight being optimized for the optimization parameter and not cause the flight envelope to conflict with a boundary of the operational envelope. In some instances, the flight plan may include portions of a flight in which the aerial vehicle is to explore or expand into operational boundaries so that travel related data may be collected and used to determine if the operational boundary may be adjusted.

The flight plan may then be provided to the aerial vehicle and the aerial vehicle instructed to navigate from the source location and to the destination location in accordance with the flight plan, as in 712.

Figure 8:
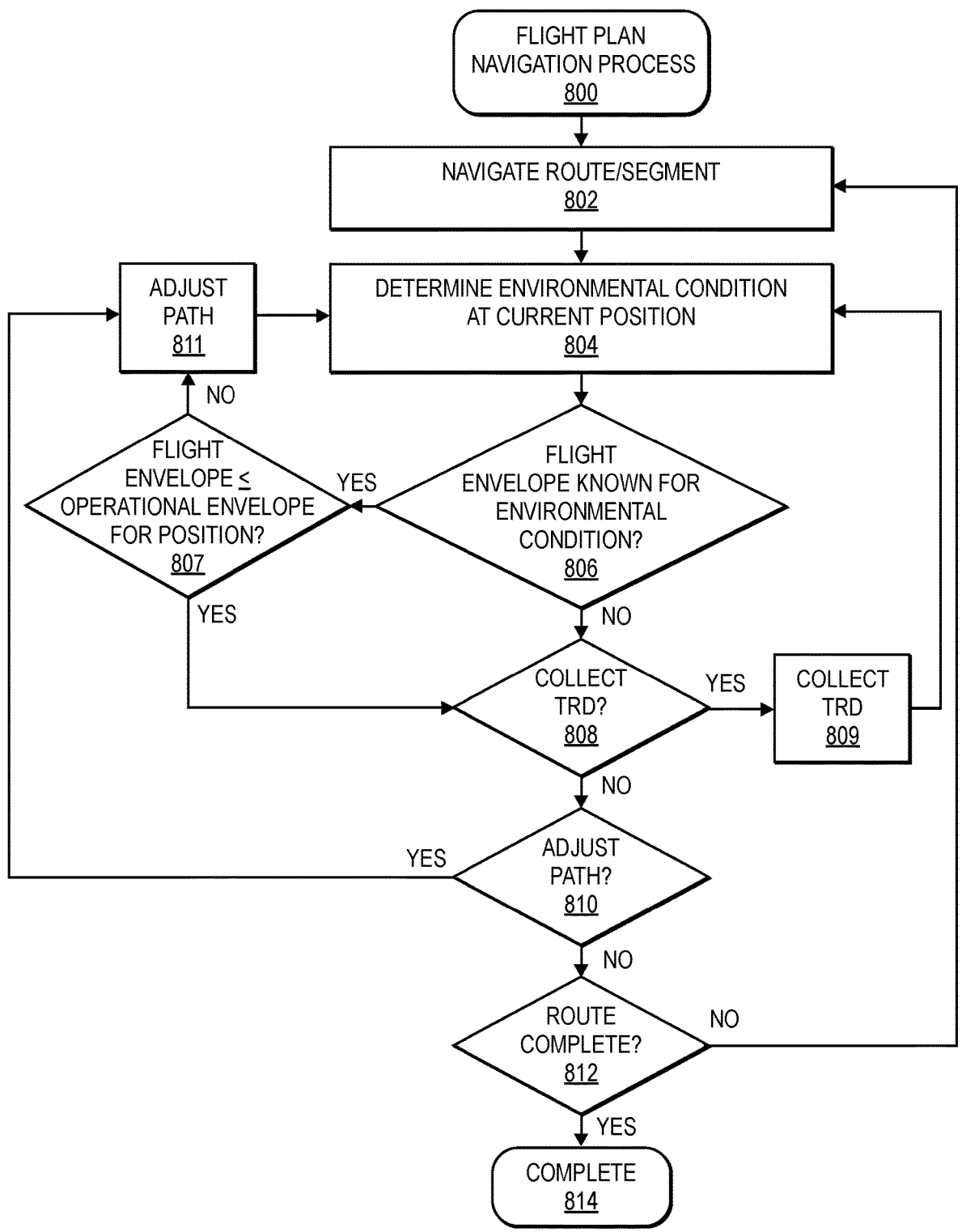
FIG. 8 is a flow diagram of an example flight plan navigation process, according to some implementations.

FIG. 8 is a flow diagram of an example flight plan navigation process 800, according to some implementations. The example process begins with an aerial vehicle initiating or continuing a route or segment of a flight plan between a source location and a destination location, as in 802. For example, the example process 800 may begin when an aerial vehicle initially departs the source location, when the aerial vehicle reaches a waypoint and begins another segment of an existing flight plant, etc. In general, the example process 800 may be performed continuously or periodically during aerial navigation of an aerial vehicle in accordance with a flight plan until completion of a route, as in 812, or completion of the example process, as in 814.

As sensor data is collected, the data is processed to determine the environmental condition at the current position of the aerial vehicle, as in 804. A determination is then made as to whether a flight envelope is known for the aerial vehicle and the determined environmental condition, as in 806. As discussed above, a flight envelope may be determined based on the aerial vehicle type of the aerial vehicle and the determined environmental condition experienced by the aerial vehicle. If it is determined that the flight envelope is known, a determination is made as to whether the dimensions of the flight envelope are less than or equal to the dimensions of the operational envelope for the current position, as in 807. As discussed above, for the aerial vehicle to safely operate, the flight envelope must be less than or equal to the operational envelope at the position of the aerial vehicle. Likewise, as discussed above, the flight envelope and/or the operational envelope may be multi-dimensional and specify not only size or area constraints but also noise, speed, and/or other constraints that must be satisfied.

If it is determined that the flight envelope is less than or equal to the operational envelope at the current position of the aerial vehicle, a determination is made as to whether travel related data is to be collected, as in 808.

Once the path is adjusted, as in 811, either to explore or to navigate away from an area in which the flight envelope is not less than or equal to the operation envelope, the example returns to block 804 and continues.

Returning to block 806, if it is determined that the flight envelope is not known for the environmental condition, a determination is made as to whether travel related data is to be collected for the unknown, or off-normal condition, as in 808. In some implementations, the determination may be made based on the largest flight envelope associated with the aerial vehicle and whether that envelope is less than or equal to the operational envelope at the current position. If the largest flight envelope is less than or equal to the operational envelope it may be assumed that continuing to navigate at the location is safe. In other implementations, for the vehicle to remain at the location of the off-normal condition, the operational envelope must be a defined percentage (e.g., 5%) or amount larger than the largest flight envelope for the aerial vehicle.

If it is determined that travel related data is to be collected, the aerial vehicle may be oriented or positioned in a first state within the experienced environmental condition and sensor data collected with regard to both the environmental condition and the operational characteristic of the aerial vehicle while the aerial vehicle is in the first state and experiencing the environmental condition, as in 809. In some instances, the aerial vehicle may remain in the off-normal environmental condition and alter the state of the aerial vehicle so that travel related data can be collected from different vehicle states while the vehicle is exposed to or experiencing the off-normal environmental condition. After collection of the travel related data, the example process 800 returns to block 804 and continues.

If it is determined that travel related data is not to be collected for the off-normal condition, the example process 800 continues to decision block 810 and continues. In some implementations, the flight path of the aerial vehicle may be periodically or randomly adjusted so that the aerial vehicle can explore other areas within the operational envelope and/or explore boundaries of the operational envelope to collect other travel related data. If it is determined that the flight path is to be altered, or if it is determined that the flight envelope is not less than the operational envelope for the current position of the aerial vehicle, instructions are generated that cause the propulsion mechanisms of the aerial vehicle to alter the path of the aerial vehicle, as in 810 or 811. The instructions may be randomly determined to alter the path of the aerial vehicle, may be pre-specified to cause the aerial vehicle to navigate in a desired direction, etc.

While the above example discusses determining if travel related data is to be collected, in some instances, travel related data may be continuously collected regardless of the environmental condition and the collected travel related data stored in a memory of the aerial vehicle and/or provided to the central command system. For example, regardless of whether it is determined at decision block 806 whether the flight envelope is known, travel related data may be collected for the current position of the aerial vehicle and any future position of the aerial vehicle.

Figure 9:
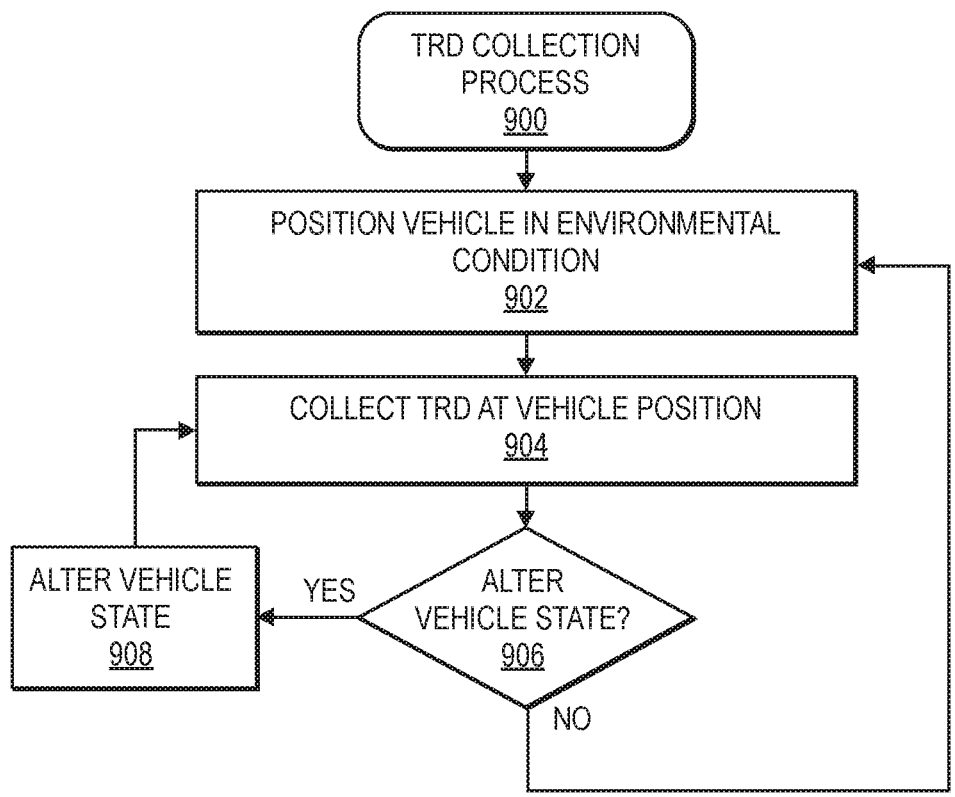
FIG. 9 is a flow diagram of an example travel related data collection process, according to some implementations.

FIG. 9 is a flow diagram of an example travel related data collection process 900, according to some implementations. As noted above, the travel related data collection process 900 may be continually performed during any aerial navigation of an aerial vehicle and the travel related data maintained in a data store of the aerial vehicle and/or provided to other systems, such as the central command system, other aerial vehicles, other vehicles, etc.

The example process 900 begins by positioning the aerial vehicle in an environmental condition, as in 902. As discussed above, the state of the aerial vehicle while positioned in the environmental condition may be any state such that data can be collected for the aerial vehicle in that particular state. The state of the aerial vehicle may include, but is not limited to, any one or more of the pose of the aerial vehicle, the operational characteristics of the propulsion mechanisms of the aerial vehicle, the position of one or more control surfaces of the aerial vehicle, the angular or translational characteristics of the aerial vehicle, whether the vehicle is in a horizontal flight position or a vertical flight position, etc.

As the vehicle is adjusted to a determined state, sensor data relating to the environmental condition and the operational characteristics of the aerial vehicle during exposure to the environmental condition are collected, as in 904. As discussed above, the aerial vehicle may include any number and/or type of environmental sensors and/or operational sensors and some or all of those sensors may be utilized by the example process to collect travel related data.

While the aerial vehicle is located in the environmental condition, a determination is made as to whether the state of the aerial vehicle is to be altered, as in 906. For example, if the environmental condition is an off-normal condition for the aerial vehicle such that a flight envelope does not exist, it may be determined that the aerial vehicle should operate within the environmental condition at numerous different states so that operational characteristic data indicative of the operational characteristics of the aerial vehicle when exposed to or experiencing the environmental condition may be collected.

If it is determined that the state of the aerial vehicle is to be altered, the state of the aerial vehicle is altered while the aerial vehicle remains positioned in the environmental condition, as in 908. If it is determined that the state of the aerial vehicle is not to be altered while the aerial vehicle is positioned in the environmental condition, the aerial vehicle continues navigation of the flight path and the example process returns to block 902 and continues. As noted above, the example process 900 may be a continuous process such that travel related data is collected at all times during aerial vehicle operation. In other implementations, the example process may only be performed periodically or when off-normal conditions are detected. As still other examples, the example process 900 may be randomly performed during vehicle operation.

Figure 10:
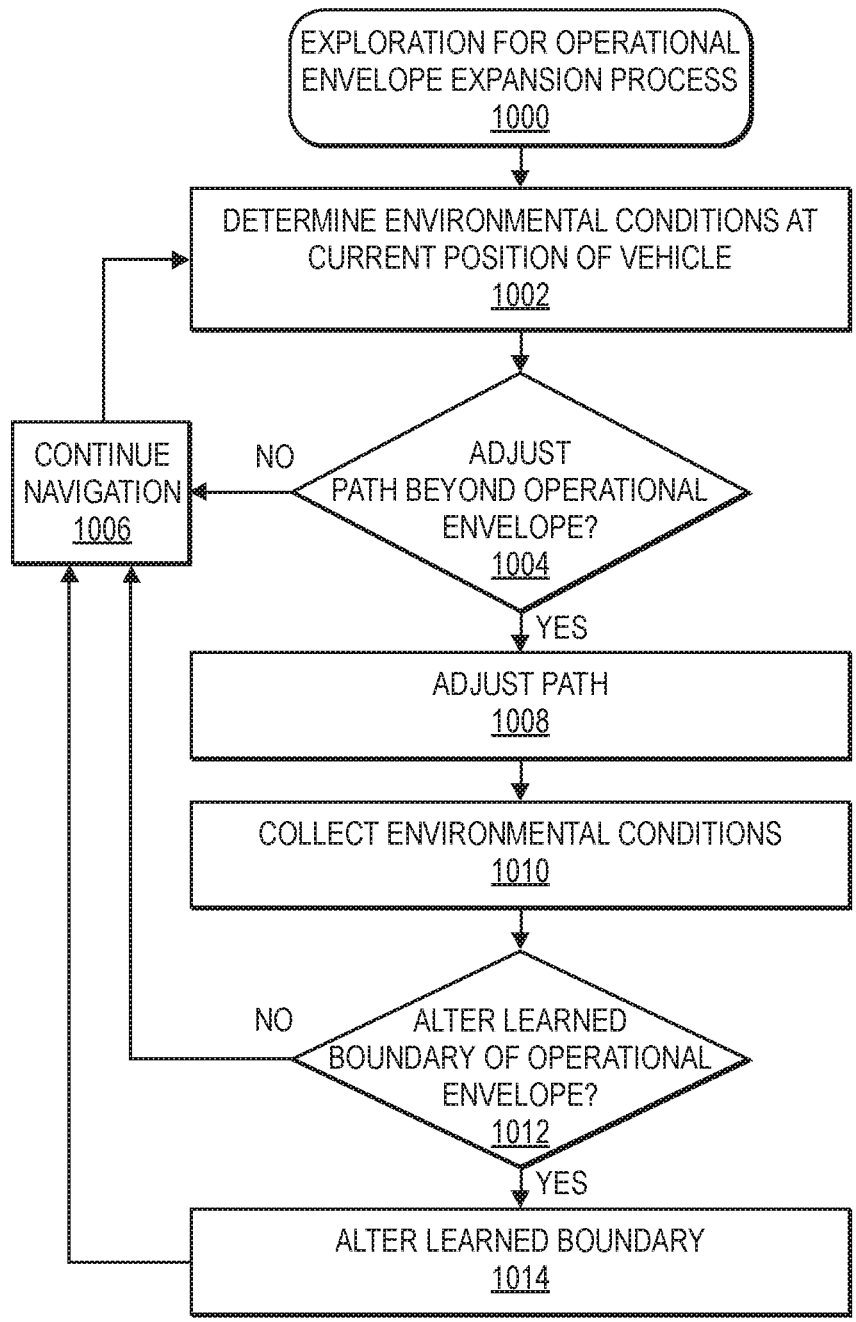
FIG. 10 is a flow diagram of an example exploration for operational envelope expansion process, according to some implementations.

FIG. 10 is a flow diagram of an example exploration for envelope expansion process 1000, according to some implementations.

The example process 1000 begins by determining an environmental condition at the current position of the aerial vehicle, as in 1002, and a determination is made as to whether the path of the aerial vehicle is to be adjusted to expend beyond a barrier of an operational envelope, as in 1004. In some implementations, exploration to expand an operational envelope may be limited to certain environmental conditions. Determination to adjust the path may be based on, for example, the environmental conditions. For example, in some implementations, the example process may only be performed when the humidity is below a defined amount, the wind speed is below a defined amount, etc. In addition, as noted above, in some implementations, only certain barrier types of an operational envelope may be crossed to determine if expansion is proper. For example, operational envelope barriers may be either permanent boundaries or learned boundaries. If the boundary is a permanent boundary, the example process may not be performed. In comparison, if the boundary is a learned boundary, the example process 1000 may be performed to determine if expansion is appropriate.

If it is determined that the path of the aerial vehicle is not to be altered, the aerial vehicle continues navigation along the flight path, as in 1006, and the example process 1000 returns to block 1002 and continues. However, if it is determined that the path of the aerial vehicle is to be adjusted to expand beyond a boundary of the operational envelope, the path of the aerial vehicle is adjusted, as in 1008. As the path of the aerial vehicle is altered and the aerial vehicle navigates closer to and eventually crosses the operational envelope boundary, environmental data and operational data are collected by sensors of the aerial vehicle, as in 1010. The collected sensor data is then processed by the aerial vehicle and/or the central command system and a determination made as to whether the learned boundary of the operational envelope is to be adjusted, as in 1012. Determination as to whether to alter a learned boundary may be done in real-time or near real-time, or at a later point in time, such as after completion of the flight plan.

If it is determined to alter the learned barrier of the operational envelope, the barrier is adjusted based on the collected environmental data, as in 1014. For example, if no object or adverse conditions are determined beyond the learned barrier, the learned barrier may be repositioned to the edge of the position at which sensor data was collected by the aerial vehicle during the example process 1000. In comparison, if objects or adverse conditions are determined, the learned operational barrier may not be adjusted, and the example process 1000 may return to block 1006 and navigation may continue. Likewise, upon adjusting the positioned of the learned barrier, the example process 1000 may return to block 1006 and navigation may continue.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 7 through 10, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system to determine unmanned aerial vehicle ("UAV") routes from travel related data, the system comprising:
    a first UAV to aerially navigate a first navigation path between a source location and a destination location, the first UAV including:
        a propulsion system;
        a sensor; and
        a first processor; and
        a first memory storing first program instructions that when executed by the first processor cause the first processor to at least:
            receive, during aerial navigation along the first navigation path, first sensor data indicative of an environmental condition at a position of the first UAV;
            determine that travel related data is to be collected, wherein the travel related data indicates the environmental condition and at least one operating parameter of the first UAV that results based at least in part on the environmental condition;
            collect the travel related data while the first UAV is at the position;
            determine that a flight envelope corresponding to the environmental condition is greater than an operational envelope for the position;
            cause the first UAV to alter course and navigate away from the position; and
            provide the travel related data to a computing system that is remote from the first UAV; and
            wherein the operational envelope indicates a maximum operational area within which the first UAV may operate at the position; and
            wherein the flight envelope indicates a minimum required operational area for the first UAV when exposed to the environmental condition; and
    the computing system including:
        a data store to maintain travel related data received from a plurality of UAVs;
        a second processor; and
        a second memory storing second program instructions that when executed by the second processor cause the second processor to at least:
            determine, based at least in part on the travel related data, a second navigation path between the source location and the destination location, wherein the second navigation path is different than the first navigation path; and
            provide the second navigation path to a second UAV that is planned to navigate between the source location and the destination location.

2. The system of claim 1, wherein the environmental condition is at least one of a wind speed, a wind direction, an altitude, a humidity, an illuminance level, a direction of a light source, a barometric pressure, temperature, radiation, or an obstacle.

3. The system of claim 1, wherein the environmental condition is an off-normal condition for which travel related data does not already exist.

4. The system of claim 1, wherein the second program instructions when executed by the second processor to cause the second processor to determine the second navigation path further include instructions that when executed by the second processor further cause the second processor to at least:
    determine an optimization parameter for which the second navigation path is to be determined; and
    determine the second navigation path based at least in part on the optimization parameter and the travel related data.

5. The system of claim 4, wherein the optimization parameter is at least one of a safety of a human, a safety of the second UAV, a speed of the second UAV, an altitude of the second UAV, an energy consumption of the second UAV, a power requirement of the second UAV, a noise level of the second UAV, a flight mode of the second UAV, a pose of the second UAV, a control surface position of a control surface of the second UAV, or an operational parameter of a sensor of the second UAV.

6. A method, comprising:
    receiving, from a first aerial vehicle, travel related data that includes an environmental condition experienced by the first aerial vehicle and an operational characteristic of the first aerial vehicle, wherein the operational characteristic is caused at least in part by the environmental condition at a position;
    determining that a flight envelope corresponding to the environmental condition is greater than an operational envelope for the position; and
    causing the first aerial vehicle to alter course and navigate away from the position;
    wherein the operational envelope indicates a maximum operational area within which the first aerial vehicle may operate at the position; and
    wherein the flight envelope indicates a minimum required operational area for the first aerial vehicle when exposed to the environmental condition.

7. The method of claim 6, further comprising:
    causing the first aerial vehicle to deviate from a planned flight path; and
    wherein the environmental condition is determined by the first aerial vehicle while deviated from the planned flight path.

8. The method of claim 6, further comprising:
determining, for an aerial vehicle type of the first aerial vehicle, the flight envelope that specifies a minimum area around the aerial vehicle type that must be available for aerial vehicle operation.

9. The method of claim 8, wherein:
a normal environmental condition is a first wind speed;
the environmental condition is a second wind speed that is greater than the first wind speed;
the operational characteristic indicates an amount of at least one of a pitch, a yaw, a roll, a surge, a heave, or a sway of the first aerial vehicle caused by the environmental condition; and
the flight envelope is determined based at least in part on the amount.

10. The method of claim 6, further comprising:
determining that the flight envelope for the environmental condition is unknown;
causing the first aerial vehicle to at least:
collect sensor data indicative of the environmental condition; and
determine, as the sensor data is collected, the operational characteristic.

11. The method of claim 6, further comprising:
determining, based on the travel related data, a flight path for a second aerial vehicle; and
providing the flight path to the second aerial vehicle.

12. The method of claim 6, further comprising:
instructing the first aerial vehicle to deviate from a second flight path to the position at which the environmental condition was experienced by the first aerial vehicle.

13. The method of claim 6, wherein the method is performed by at least one of a first computing resource that is remote from the first aerial vehicle, or a second computing resource included on the first aerial vehicle.

14. A computer-implemented method, comprising:
aerially navigating, with an aerial vehicle, at least a portion of a first flight path;
collecting, with at least one sensor, environmental condition data indicative of an environmental condition;
determining an operational characteristic of the aerial vehicle caused at least in part by the environmental condition;
providing travel related data that includes a position at which the environmental condition data was collected and at least one of the environmental condition data or the operational characteristic;
determining that a flight envelope corresponding to the environmental condition is greater than an operational envelope for the position; and
causing the aerial vehicle to alter course and navigate away from the position;
wherein the operational envelope indicates a maximum operational area within which the aerial vehicle may operate at the position; and
wherein the flight envelope indicates a minimum required operational area for the aerial vehicle when exposed to the environmental condition.

15. The computer-implemented method of claim 14, further comprising:
deviating from a planned flight path; and
subsequent to deviating from the planned flight path, collecting, with a sensor of the aerial vehicle, the environmental condition data.

16. The computer-implemented method of claim 14, further comprising:
determining an optimization parameter; and
generating a second flight path based at least in part on the travel related data and the optimization parameter.

17. The computer-implemented method of claim 16, wherein the optimization parameter is at least one of a safety of a human, a safety of the aerial vehicle, a speed of the aerial vehicle, an altitude of the aerial vehicle, an energy consumption of the aerial vehicle, a power requirement of the aerial vehicle, a noise level of the aerial vehicle, a flight mode of the aerial vehicle, a pose of the aerial vehicle, a control surface position of a control surface of the aerial vehicle, or an operational parameter of a sensor of the aerial vehicle.

18. The computer-implemented method of claim 14, wherein the operational characteristic indicates an amount of at least one of a pitch of the aerial vehicle, a yaw of the aerial vehicle, a roll of the aerial vehicle, a surge of the aerial vehicle, a heave of the aerial vehicle, a sway of the aerial vehicle, a pose of the aerial vehicle, or a control surface position of a control surface of the aerial vehicle caused by the environmental condition.

19. The computer-implemented method of claim 14, further comprising:
positioning the aerial vehicle in a first state while the environmental condition is experienced by the aerial vehicle;
determining the operational characteristic while the aerial vehicle is in the first state;
positioning the aerial vehicle in a second state while the environmental condition is experienced by the aerial vehicle; and
determining a second operational characteristic while the aerial vehicle is in the second state, wherein the second operational characteristic is different than the operational characteristic and based at least in part on the environmental condition and the second state of the aerial vehicle.

* * * * *